Figure 1:
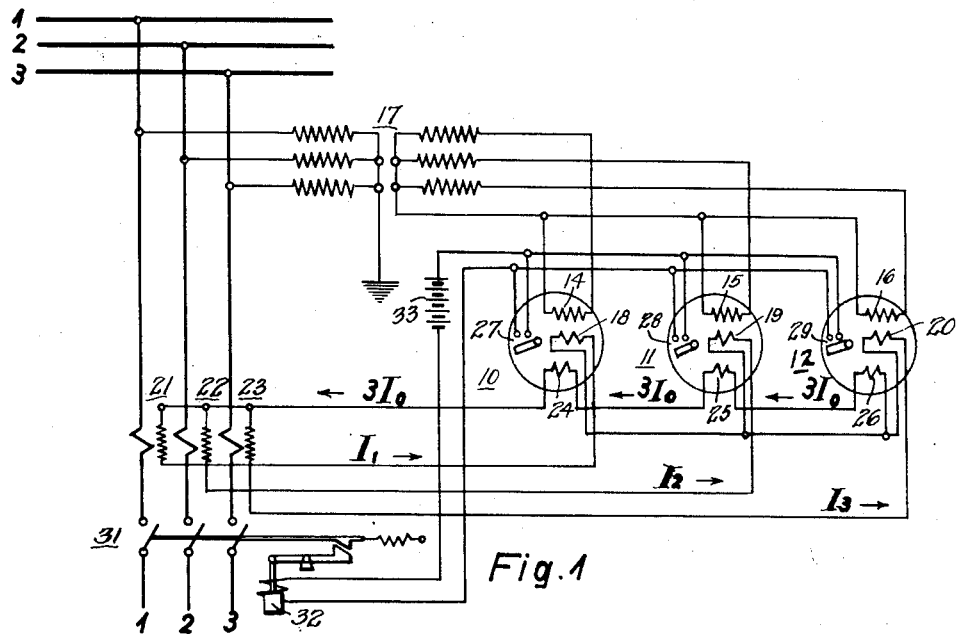

Jan. 8, 1935.   G. DARRIEUS   1,987,285

PROTECTIVE SYSTEM

Filed Feb. 21, 1931

Inventor
Georges Darrieus
By
Attorney.

Patented Jan. 8, 1935

1,987,285

REISSUED

UNITED STATES PATENT OFFICE 1,987,285

PROTECTIVE SYSTEM

Georges Darrieus, Houilles, France, assignor to Aktiengesellschaft Brown Boveri & Cie., Baden, Switzerland, a joint-stock company of Switzerland Application February 21, 1931, Serial No. 517,548
In France February 22, 1930

13 Claims. (Cl. 175—294)

My invention relates to electric circuit protection and more particularly to improvements in protective systems for controlling alternating current circuits on the occurrence of abnormal conditions therein with a selective action in dependence on the impedance of the circuit between two points thereof whereby a section of the circuit, on which a fault connection occurs, may be selectively interrupted without affecting the continuity of service of the remainder of the circuit.

In such systems of electric circuit protection it is usual to employ relays operating on the impedance principle with a time-delay action, i. e., relays operating on the ratio between the voltage and current $$\left(\frac{E}{I}\right)$$

Such relays, as is well known, are connected with a circuit at suitable section junction points, such as distributing stations and the like, so that the relays nearest to the fault connection operate first and isolate the faulty section of the circuit without interruption of the continuity of service on the sound sections of the circuit. In the utilization of such relays for the selective protection of electric circuits the circuit interrupting times thereof should correspond to the impedance of the circuit, which is proportional to the length of the circuit from the point of the relay connection thereto to the point of fault connection, that is, the circuit interrupting times should be proportional to the distance of the fault from the relays.

It has been found, however, that the impedance measured by such relays is also dependent on the distribution of the current so that it is not a simple function of the distance from the fault from the relay, thus the time gradations and the operation of the relays may be affected.

One feature of my invention is, therefore, a protective system for electric circuits employing relays operating on the impedance principle, arranged and connected with a circuit to be protected in such a manner as to be selectively operative to cause disconnection of a faulty section of the circuit, in a time in dependence upon the distance of the fault connection point from the connection points of the relays; and regardless of the nature of the fault, i. e., regardless of whether the fault connection be between a phase conductor and ground, or whether the fault connection be between two or more phase conductors of the circuit.

Figure 2:
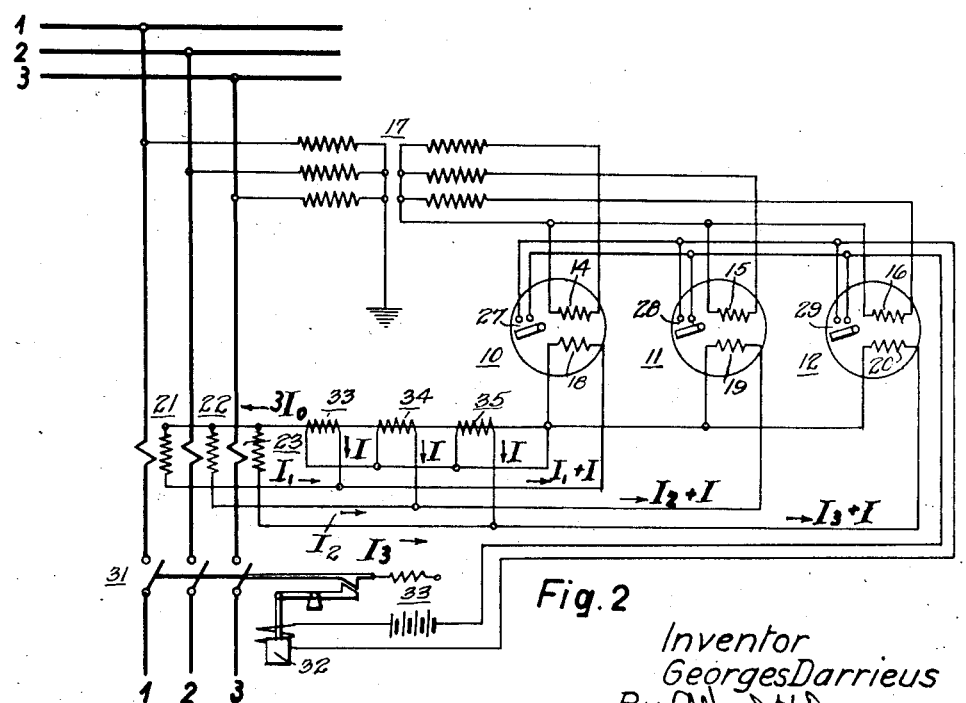

Other features and objects of the invention will be apparent to those skilled in the art from the following description and claims when read in connection with the accompanying drawing in which:

Figure 1 is a schematic diagram showing, for purposes of illustration, one arrangement of apparatus and connections wherein a plurality of relays of the impedance type are arranged and connected in circuit with the respective phases of a polyphase alternating current circuit in such a manner as to be selectively responsive to the impedance of the line upon the occurrence of a fault connection therein; and Figure 2 is a schematic diagram showing, also for purposes of illustration, a modified embodiment of the invention, wherein the connections of the apparatus are arranged in a manner somewhat different from the arrangement in the embodiment according to Figure 1 of the drawing.

The arrangement of the apparatus and its operation, and the following explanations with respect thereto, are predicated upon Fortesque's well known Method of Symmetrical Co-ordinates (Transactions of American Institute of Electrical Engineers, vol. XXXII Part 2, p. 1027, et seq.); and Symmetrical Components by Wagner and Evans (The Electric Journal vol. XXV, No. 3, p. 151, et seq.).

In this method the system of any three phase currents $I_1$, $I_2$, $I_3$ is replaced by three symmetrical systems: the positive sequence system is represented by three currents of equal magnitude $I_d$ in three phases, but each displaced relative to one another by 120° in a positive sense; the negative sequence system is also represented by three currents of equal magnitude $I_i$, but each displaced relative to one another by 120° in a negative sense; lastly, there is the zero sequence system represented by three parallel currents of equal magnitude $I_0$.

Hence:—

$$I_1 = I_0 + I_d + I_i$$
$$I_2 = I_0 + I_d \epsilon^{-j120°} + I_i \epsilon^{j120°} \quad (1)$$
$$I_3 = I_0 + I_d \epsilon^{-j240°} + I_i \epsilon^{j240°}$$

The total voltage drop along the line is made up of the separate values of the drop in voltage caused by the various current systems, and is determined for the different disturbances as follows:—

*Case I.—Single-phase fault to earth*

The voltage to earth of the affected phase at any point in the network is given in terms of symmetrical components by the following equation:—

$$E_1 = Z_d I_d + Z_i I_i + Z_0 I_0$$

where $Z_d$, $Z_i$, $Z_0$, are the positive, negative, and zero sequence system impedances respectively of such phase conductor portion thereof from the point therein to the earth fault. Since the impedance of the lines is:—$Z_d = Z_i$, then the above equation becomes:—

$$E_1 = Z_d (I_d + I_i) + Z_0 I_0$$
$$= Z_d (I_d + I_i + I_0) + (Z_0 - Z_d) I_0$$

$$E_1 = Z_d I_1 + (Z_0 - Z_d) I_0 = Z_d \left[ I_1 + \left( \frac{Z_0}{Z_d} - 1 \right) I_0 \right] \quad (2)$$

but according to Equation (1) which is $$3I_0 = I_1 + I_2 + I_3$$

therefore $$E_1 = Z_d \left[ \frac{2 + \frac{Z_0}{Z_d}}{3} \times I_1 + \frac{\frac{Z_0}{Z_d} - 1}{3} (I_2 + I_3) \right] \quad (3)$$

After the coils of a relay of the impedance type, i. e., responsive to the ratio of $$\frac{E}{I}$$

of the phase voltage to the phase current are energized according to the values $E_1$, $I_1$, respectively, such relay will operate in response to the value of a fictitious impedance $$Z = \frac{E}{I}$$

which from Equation (2) is always equal to:

$$Z = \frac{E_1}{I_1} = Z_d \left[ 1 + \left( \frac{Z_0}{Z_d} - 1 \right) \frac{I_0}{I_1} \right] \quad (4)$$

Z is, therefore, not only dependent on the line constants $Z_d$ and $Z_0$, but also on the ratio $$\frac{I_0}{I_1}$$

of the zero sequence to the phase current. This relation can, however, vary according to the position of the earth fault, the place, and method of earthing the neutral point of the network, so that the relays may measure different impedances for the same distances from the earth fault.

Case II.—2-phase fault to earth, for instance, phases 1 and 2

Assuming that a separate relay is inserted in each faulty phase, the Equations (2), (3), and (4) also apply. To these, however, must be added the corresponding equations for phase 2, for example, $$E_2 = Z_d \left[ I_2 + \left( \frac{Z_0}{Z_d} - 1 \right) I_0 \right] \quad (5)$$

and $$Z' = \frac{E_2}{I_2} = Z_d \left[ 1 + \frac{Z_0}{Z_d} - 1 \frac{I_0}{I_1} \right] \quad (4')$$

Here again the impedances measured by the relays are dependent on the ratios $$\left( \frac{I_0}{I_1} \right) \text{ and } \left( \frac{I_0}{I_2} \right)$$

and furthermore, differ from that given in case I, since $$\frac{I_0}{I_1}$$

is different from $$\frac{I_0}{I_2}$$

Case III.—3-phase fault to earth

Here $$I_0 = 0 \text{ and } E_1 = Z_d I_1 \quad (6)$$

and the total impedance measured is $$Z = \frac{E_1}{I_1} = Z_d \quad (7)$$

i. e. is equal to the normal short circuit impedance of the line. This impedance is correct for distance, but is again different from the values measured in Cases I and II.

In order to make the impedance measured by the relay independent of the ratio $$\left( \frac{I_0}{I_1} \right) \left( \frac{I_0}{I_2} \right)$$

and independent of the fault conditions, then according to the invention, current $$I = I_0 \left( \frac{Z_0}{Z_d} - 1 \right) \quad (8)$$

is supplied to each relay in addition to the phase current. As is evident from the above Equations (2), (5), and (6), the impedance measured by the relays, and controlling the tripping times, are for each relay the equivalent of $$Z = \frac{E_1}{I_1 + \left( \frac{Z_0}{Z_d} - 1 \right) I_0} = Z_d \quad (9)$$

and are consequently correct for distance and independent of the nature of the fault. ($I_0$ is 0 in case III). The value $$\frac{Z_0}{Z_d}$$

varies; for example, for transmission lines such value is approximately 4. In this case the relays instead of applying current I (Equation 4) it is sufficient to apply current $3 I_0$, i. e. the sum of the line currents. Naturally it suffices if the condition expressed in Equation (8) is only approximately satisfied, because this current acts only as a compensator.

According to Equation (3) all three currents $I_1$, $I_2$, and $I_3$, can also be supplied to the relays in order that the required result may be obtained.

Since Equation (2) is correct for each kind of earth fault, then in the case of several faults to earth, i. e. when earth faults occur simultaneously on two or more phases at different places on the network, the impedance measured corresponds to the correct distance.

In the 2-phase fault connection to earth the relays may also be so arranged that the line voltage, for example $$E_{12} = E_1 - E_2$$

and the difference of the phase currents $$I_1 - I_2$$

operate the relays. Then again, according to Equations (2) and (5) the impedance measured by the relays is:—

$$Z = \frac{E_{12}}{I_1 - I_2} = Z_d$$

The above improvement is applicable for overhead as well as cable transmission, and for single-phase systems, because the above equations are also valid $$(I_3 = 0)$$

It is also immaterial whether the relays have a continuous or a stepped time-characteristic, and whether the tripping times are only dependent on the absolute values of the impedance, or also on the phase angle of the impedance.

The zero sequence current $I_0$, is, for instance, to be taken from the common neutral connection of the three current phase transformers connected in star, because from Equation (1)

$$I_0 = \frac{I_1 + I_2 + I_3}{3}$$

From the foregoing explanations it will, it is believed, be obvious that the invention is not limited to the use of time-delay impedance responsive relays of any particular structural arrangement, and that the connection thereof may be modified to suit particular conditions. Thus, in the embodiment of the invention according to Fig. 1, of the drawing, I have shown the impedance responsive relays 10, 11, 12, as having voltage coils 14, 15, 16, respectively, connected to be energized in accordance with potentials of respective phase conductors 1, 2, 3, of the line by way of a grounded neutral star connected potential transformer 17; current coils 18, 19, 20, connected with the secondary windings of the respective current transformers 21, 22, 23, to be energized therefrom in accordance with the currents flowing in the respective phase conductors 1, 2, 3, of the line; and as having current coils 24, 25, 26, serially connected in circuit with a zero phase sequence conductor $3I_0$ to be thereby energized in accordance with the zero phase sequence current of the line. Thus, upon the occurrence of a fault connection between any two, or all, of the phase conductors 1, 2, 3, or a fault connection between any of the phase conductors 1, 2, 3, and ground, the corresponding relay, or all relays 14, 15, 16, will be actuated to close their respective contacts 27, 28, 29, to thereby establish the energizing circuit, including a source of current supply, for example, battery 33, for the tripping magnet 32 of the circuit breaker 31, in a period of time in dependence upon the ratio of the voltage impressed on the voltage coils 14, 15, 16, to the current flowing in the current coils 18, 19, 20, plus the zero phase sequence current, if any, flowing in their current coils 24, 25, 26.

The embodiment of the invention according to Fig. 2 of the drawing differs from the embodiment of Figure 1 of the drawing substantially only in that in the embodiment according to Figure 2, the zero phase sequence current windings of the relays 10, 11, 12, are dispensed with and the zero phase sequence currents are superimposed upon the phase conductor currents by means of auxiliary current transformers 33, 34, 35, respectively, energized from zero phase sequence conductor $3I_0$. Thus in the arrangement according to Figure 2 of the drawing the current windings 18, 19, 20, respectively, of the relays 10, 11, 12, and energized in accordance with the vectoral sum of the current flowing in the phase conductors and the current, if any, flowing in the zero phase sequence current conductor $3I_0$. Therefore, in the arrangement according to Figure 2, upon the occurrence of a fault connection between any two phase conductors 1, 2, 3, of the line, or any fault connection between any of the phase conductors 1, 2, 3, and ground, the corresponding relay, or relays, 14, 15, 16, will be actuated to close their respective contacts 27, 28, 29, to establish thereby the energizing circuit, including the source of current supply 33, for the tripping magnet 32 of the circuit breaker 31, in a period of time in dependence upon the ratio of the voltage impressed on the voltage coils 14, 15, 16, to the current flowing in the current coils 18, 19, 20, i. e., the vectoral sum of the respective phase current and the zero phase sequence current.

It is claimed and desired to secure by Letters Patent:—

1. In a protective system for electric circuits, a polyphase line, a relay for controlling said line and having elements connected therewith operatively engergized therefrom upon the occurrence of a fault connection in one of the phases thereof in dependence upon the voltage of said phase divided by the quantity (line current in said phase plus the sum of the currents flowing in all phases of said line).

2. In a protective system for electric circuits, a polyphase line, an impedance responsive relay for controlling said line associated with one of the phases thereof and having elements connected with said line and operatively energized therefrom upon the occurrence of a fault connection in said phase in dependence upon the voltage of said phase divided by the quantity (line current in said phase plus the zero phase sequence current of the line).

3. In a protective system for electric circuits, a polyphase line subject to ground fault connections thereto, an impedance responsive relay associated with one of the phases of said line and having elements connected with and operable from said line upon the occurrence of a ground fault connection to said phase in dependence upon the impedance of said phase from the point of connection of the relay thereto to the point of said fault connection and regardless of the value of the zero phase sequence current of the line.

4. In a protective system for electric circuits, a polyphase line subject to the occurrence of ground faults connections therein, a plurality of selectively operated impedance responsive relays for controlling said line, there being one relay for each phase conductor of said line, each said relay having a potential winding connected to be energized in accordance with the potentials to ground of the respective phase conductors upon the occurrence of a ground fault connection therein, a current winding connected in series relation with the respective phase conductors of said line to be energized in accordance with the current flowing therein, and a winding connected with said line to be energized in accordance with the zero phase sequence currents of said line.

5. In a protective system for electric circuits, a polyphase line subject to the occurrence of fault connections therein, a plurality of selectively operated impedance responsive relays for controlling said line, there being one relay for each phase conductor of said line, each said relay having a potential winding connected to be energized in accordance with the potentials of the respective phase conductors upon the occurrence of a fault connection therein, a current winding connected in series relation with the respective phase conductors to be energized in accordance with current flowing therein, and a winding connected with said line to be energized in accordance with the zero phase currents of said line to thereby cause the selective operation of the said relays in dependence on the value of the phase impedance of said line from the point of connection of said relays therewith to the point of said fault connection regardless of the nature of the fault connections.

6. In a protective system for electric circuits, a polyphase line subject to fault connections therein, a relay for controlling said line having elements and connections thereof such as to cause selective operation of said relay upon the occurrence of a fault connection in said line in dependence upon the voltage of a phase thereof divided by the quantity (line current in said phase plus the zero phase sequence current of the line) whereby the relay is operated regardless of the value of the zero phase sequence current.

7. In a protective system for electric circuits, a polyphase line subject to fault connections therein, a relay for controlling said line having elements connected therewith and operatively energized upon the occurrence of a fault connection in a phase of said line in dependence upon the voltage of said phase divided by the quantity line current in said phase plus the quantity (ratio of zero phase sequence impedance of the line to the positive phase sequence impedance of the line minus one) multiplied by the zero phase sequence current.

8. In a protective system for electric circuits, a polyphase line subject to fault connections therein, a relay for controlling said line having elements connected with a phase thereof and operatively energized upon the occurrence of a fault connection therein in dependence upon the ratio of the voltage of said phase to the current in said phase, and means for superimposing on one of said elements a current proportional to the zero phase sequence current of said line.

9. In a protective system for electric circuits, a polyphase line subject to the occurrence of fault connections therein, a plurality of relays for controlling said line, there being one relay for each phase conductor of said line, each said relay having a potential winding and a current winding connected with said line in such manner as to cause selective operation of the relays upon the occurrence of fault connections therein in dependence upon the phase voltage divided by the quantity line current in said phase conductor plus the quantity (ratio of zero phase sequence impedance of the line to the positive phase sequence impedance of the line minus one) multiplied by the zero phase sequence current.

10. In a protective system for electric circuits, a polyphase line subject to the occurrence of fault connections therein, a plurality of relays for controlling said line, there being one relay for each phase conductor of said line having a potential winding and a current winding connected to be selectively operatively energized in accordance with the voltage and the current respectively of the respective phase conductors upon the occurrence of a fault connection therein, and means for superimposing on the said current coil of each said relay a current proportional to the zero phase sequence current of said line to thereby cause the said relays to operate in dependence upon the voltage of the respective phase conductors divided by the quantity (line current in the respective phase conductors plus the said current proportional to the zero phase sequence current of said line) regardless of the value of the zero phase sequence current of the line.

11. In a protective system for electric circuits, a polyphase line, a plurality of relays for controlling said line, there being one relay for each phase of said line having a potential winding and a current winding connected with the respective phase conductors operatively energized in dependence upon the voltage and current of the respective phase conductors upon the occurrence of a fault connection therein, a common return conductor included in the circuit of said current coils, and current transformers energized from said conductor operative to impress upon the respective said current coils a current proportional to the zero phase sequence current of the line to thereby cause the said relays to operate regardless of the value of the zero phase sequence current of the line and to operate in accordance with the impedance of the line between the point of connection of the said relays therewith and the point of the fault connection therein regardless of the nature of the fault connection.

12. In a protective system, an electric current circuit comprising a plurality of conductors, and an impedance responsive relay having elements thereof connected with one of said conductors and energized therefrom to cause operation of said relay upon the occurrence of a fault connection with said one of said conductors in dependence on the impedance thereof from the point of connection of said elements therewith to the point of the fault connection therein regardless of the nature of said fault connection.

13. In a protective system for electric circuits, a polyphase line subject to phase to ground and phase to phase fault connections therein, a relay for controlling said line having elements thereof connected with said line and operable therefrom responsive to any one of said fault connections in dependence on the impedance of said line from the point of connection of said elements thereto to the point of said fault connection regardless of the value of the zero phase sequence current of said line.

GEORGES DARRIEUS.